Inventors
Roger H. Stohlquist
Leo Strombeck
By McCanna, Morsbach & Pillote
Attys

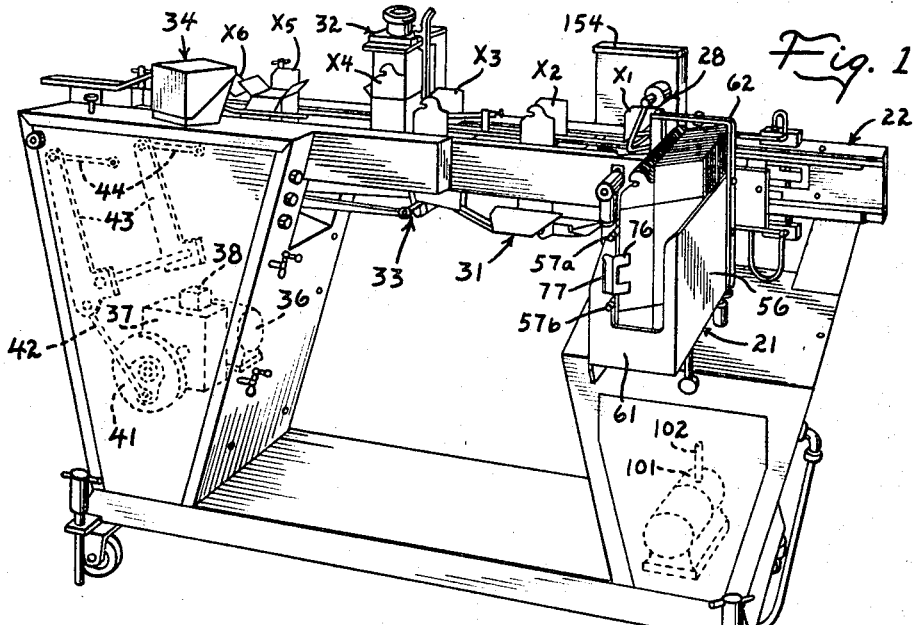
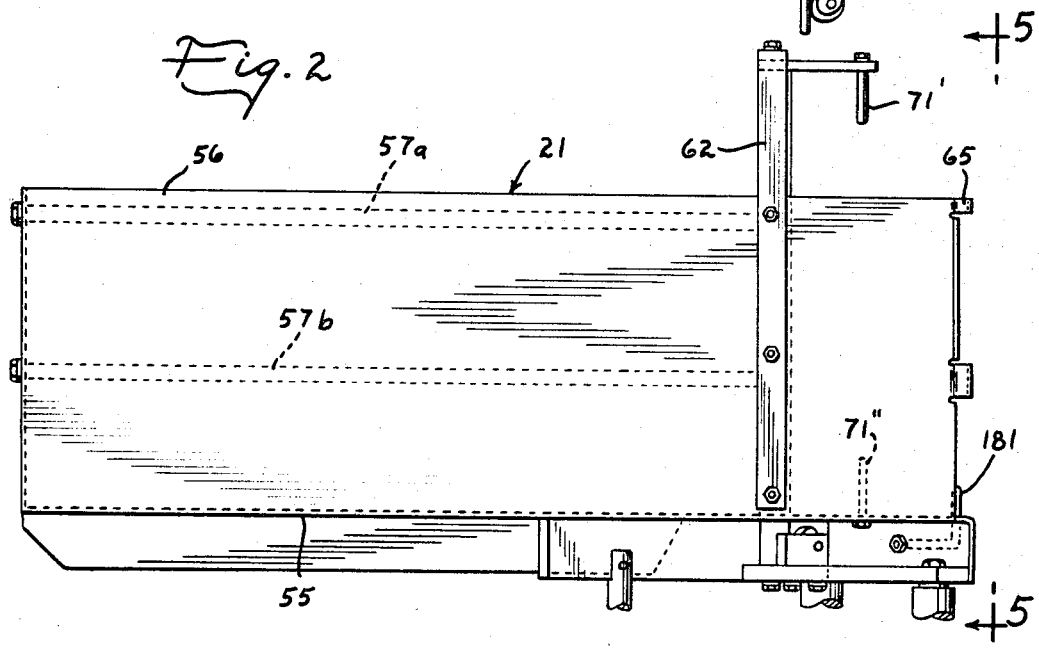

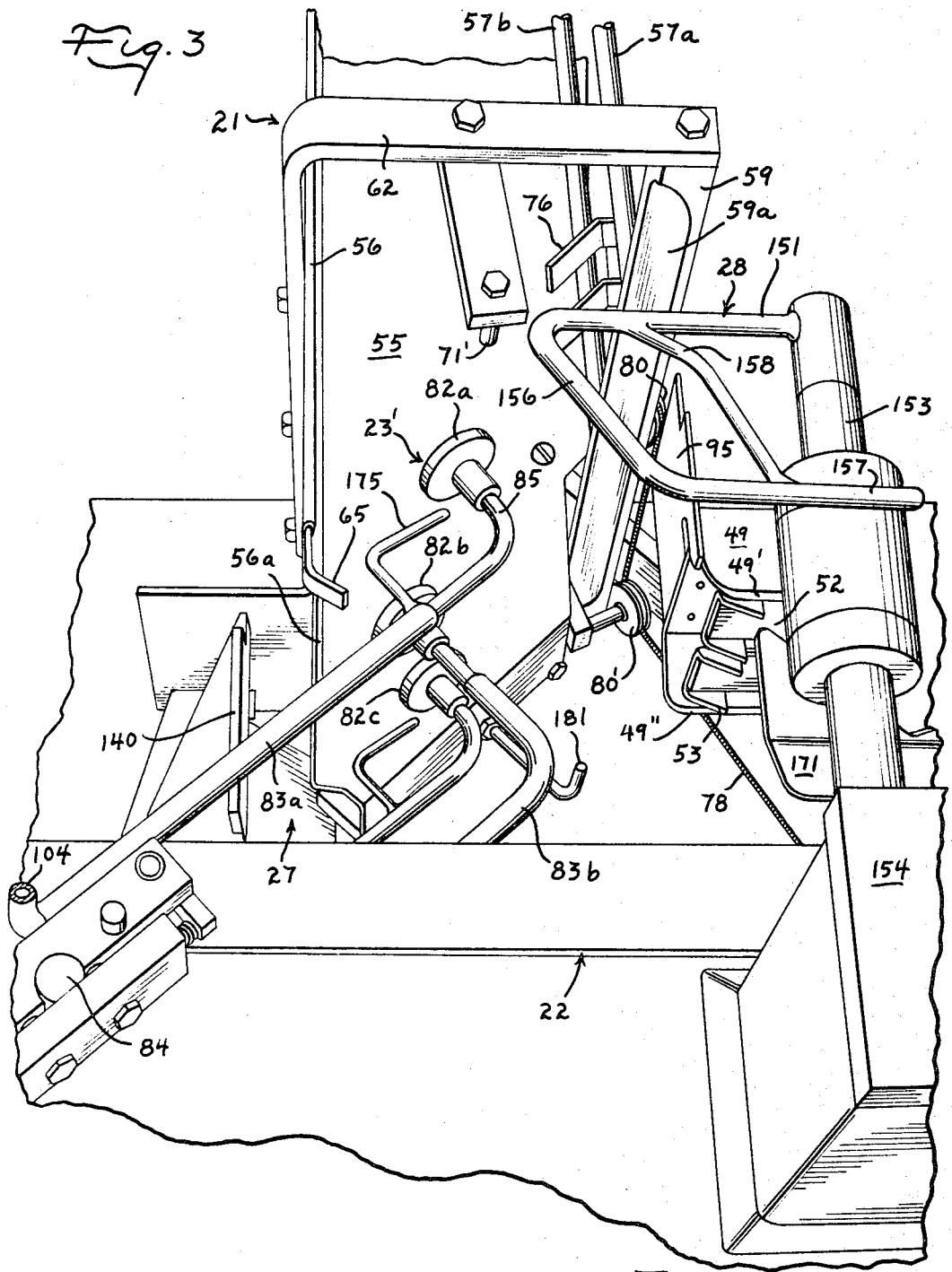

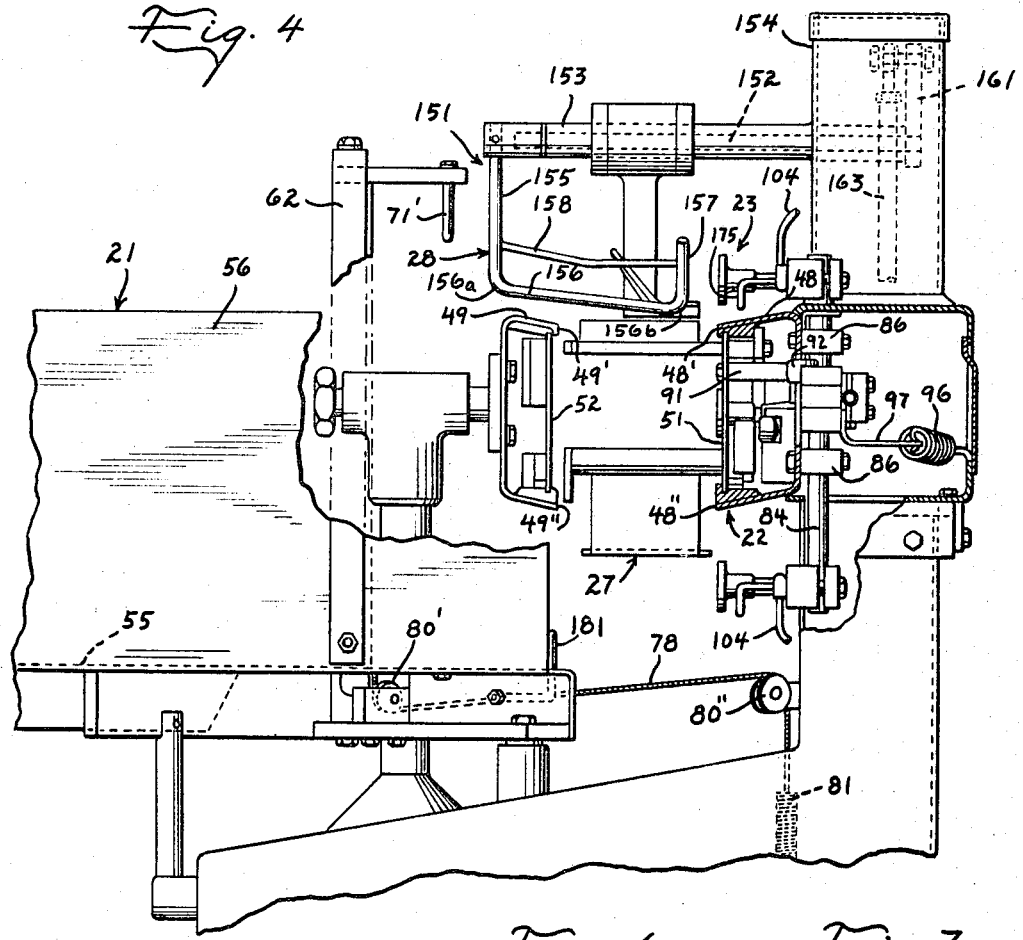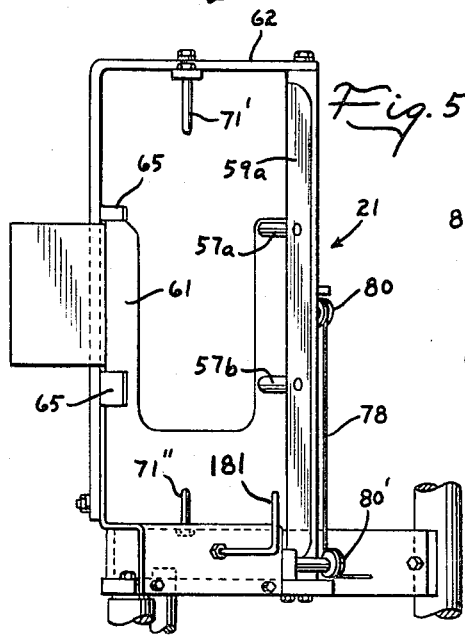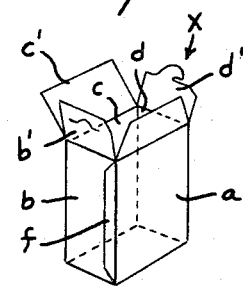

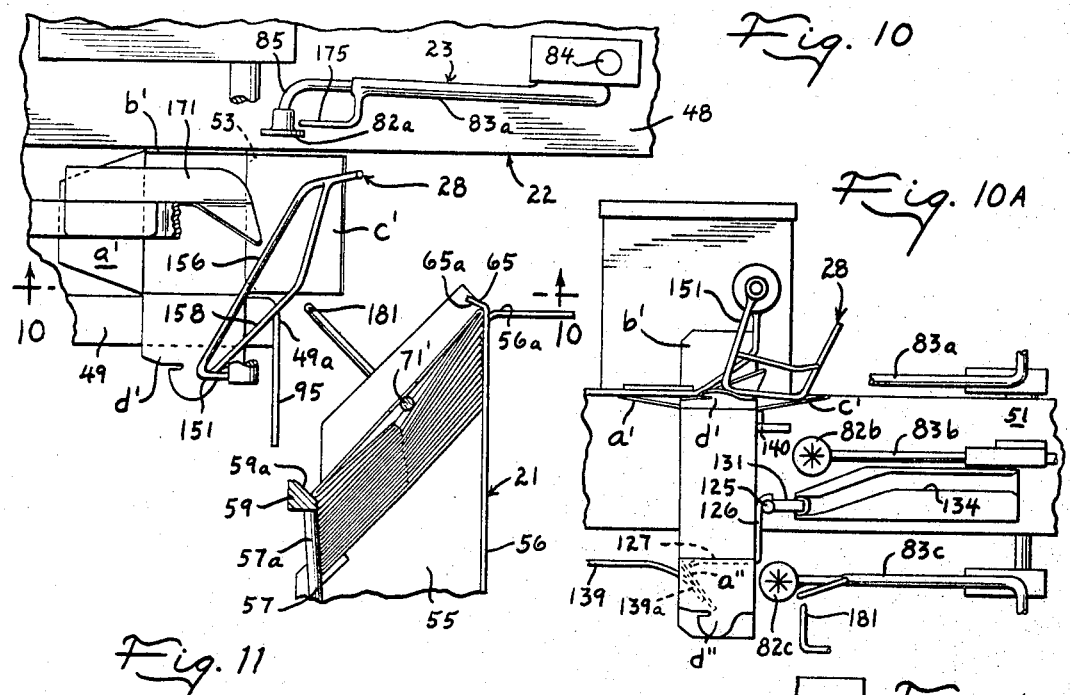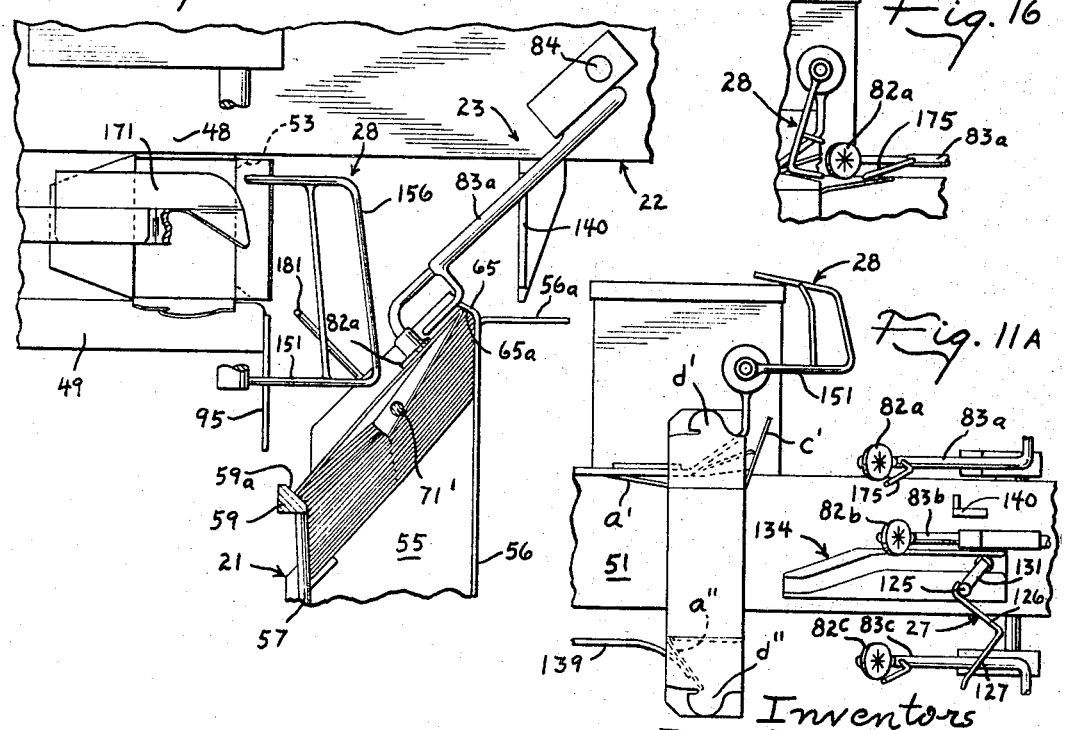

Inventors
Roger H. Stohlquist
Les Strombeck
By McCenna, Morsbach & Pillote
Atty's United States Patent Office 3,418,893
Patented Dec. 31, 1968

3,418,893
CARTON FEEDING AND ERECTING APPARATUS
Roger H. Stohlquist and Leo Strombeck, Rockford, Ill.,
 assignors to Anderson Bros. Mfg. Co., Rockford, Ill.,
 a corporation of Illinois
Filed Dec. 30, 1965, Ser. No. 517,681
12 Claims. (Cl. 93—53)

ABSTRACT OF THE DISCLOSURE

An apparatus for feeding flattened carton blanks from a magazine to a conveyor and for opening and erecting the cartons. The lateral carton guides of the magazine are spaced apart a distance less than the width of a flattened carton so that the blanks extend obliquely therebetween and the magazine advances the cartons to a magazine mouth extending obliquely to the lateral carton guides. The end cartons are individually withdrawn from the stack in a direction generally normal to the plane of the end carton and are opened and squared as they are moved onto the conveyor. A flap folding apparatus is provided for folding the end flaps on the carton as it is moved onto the conveyor.

---

This invention relates to an apparatus for feeding and erecting cartons in preparation for subsequent filling of the cartons in a filling machine.

An important object of this invention is to provide a carton feeding and erecting apparatus which is operable at high speeds to feed flattened cartons from a stack and to open and erect the flattened cartons.

Another object of this invention is to provide a carton feeding and erecting apparatus having an improved carton storage and dispensing magazine for storing and dispensing flattened cartons one at a time to the carton feed mechanism.

Still another object of this invention is to provide a carton feeding and erecting apparatus for feeding flattened cartons from a stack to a conveyor and for erecting and squaring the cartons, having an improved mechanism for deflecting the upper flaps on the carton to open the upper flaps preparatory to filling of the same.

These, together with other objects and advantages of this invention will be readily understod by reference to the following detailed description, when taken in connection with the accompanying drawings wherein:

FIG. 1 is a perspective view of a filling machine embodying the carton feeding and erecting apparatus of the present invention;

FIG. 2 is a side elevational view of the magazine for storing flattened cartons;

FIG. 3 is a fragmentary perspective view of the carton feeding and erecting apparatus;

FIG. 4 is a fragmentary end elevational view of the filling machine having the carton erecting apparatus applied thereto and with parts broken away and shown in section to illustrate details of construction;

FIG. 5 is an end elevational view of the carton storage magazine taken on the plane 5—5 of FIG. 2;

FIG. 6 is a side view of a flattened carton illustrating the manner in which it is stored in the carton magazine;

FIG. 7 is a perspective view of a carton after it has been opened and squared and prior to filling of the same;

FIGS. 10–15 are fragmentary plan views illustrating the carton erecting and folding apparatus in different moved positions, and with the parts in FIGS. 12–15 shown in a smaller scale than in FIGS. 10 and 11;

Figure 8:
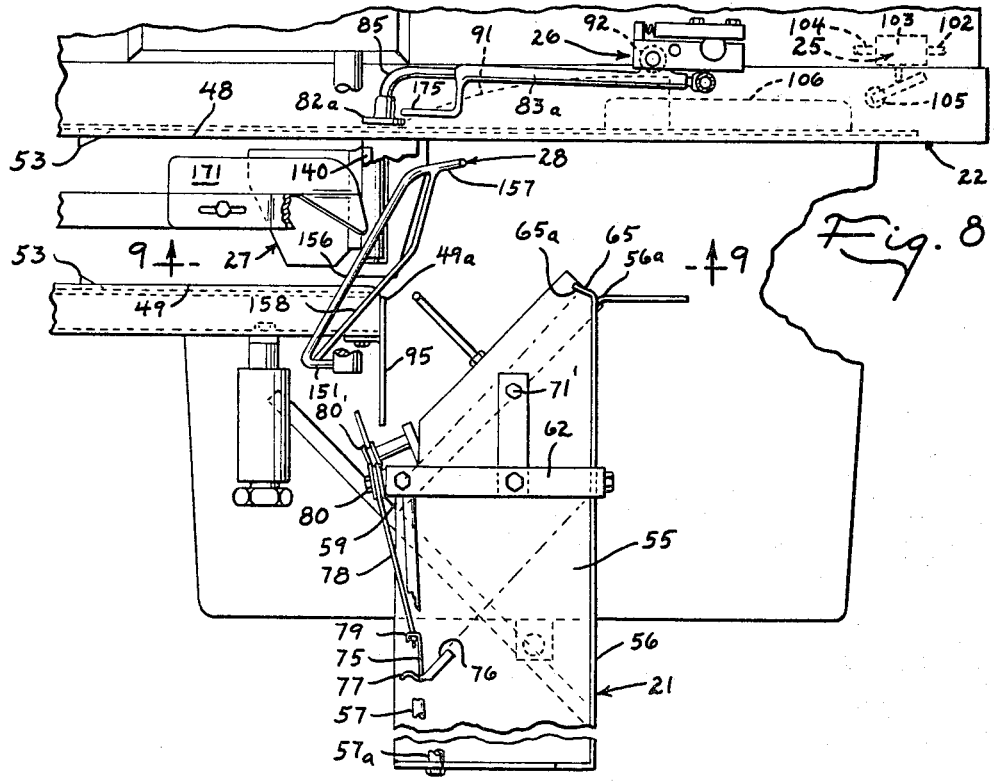
FIG. 8 is a fragmentary plan view of a filling machine embodying the carton erecting and folding apparatus and illustrating the latter in its normal or "stop" position.

FIGS. 10A, 11A, 13A and 14A are diagrammatic vertical sectional views taken along a plane indicated at 10—10 in FIG. 10, and illustrating the carton feeding and erecting apparatus in the different moved positions corresponding respectively to the positions shown in FIGS. 10, 11, 13 and 14; and FIG. 16 is a fragmentary vertical sectional view illustrating a further moved position of the carton feeding and erecting apparatus which is intermediate the positions shown in FIGS. 10A and 11A.

The present invention relates to improvements in carton feeding and erecting apparatus of the type disclosed and claimed in the copending application of Ralph F. Anderson and Leo Strombeck, Ser. No. 341,527, filed Jan. 31, 1964, now Patent No. 3,298,288.

The carton feeding and erecting apparatus of the present invention has a general utility for use in feeding flattened cartons from a stack to a conveyor and for opening and squaring the carton as it is moved from the stack to the conveyor. In its preferred form, the conveyor forms a part of a filling machine and the conveyor is arranged to advance the opened cartons past a lower flap folding apparatus which closes the lower end of the carton and then past the filling station and to a further flap folding apparatus which closes the upper end of the carton.

The carton feeding and erecting apparatus in general includes a magazine 21 for storing a stack of flattened cartons, with the end carton in the stack laterally offset from a conveyor 22. A vacuum operator gripper mechanism 23 is provided for engaging the face of an end carton in the stack and is moveable from a position engaging one of the panels of the flattened carton in the stack, to a position adjacent one side of the conveyor to move the panel laterally off the stack and into position at the conveyor. A means is provided for opening the carton in response to movement of the same laterally off the stack into engagement with the conveyor. The application of vacuum to the gripper means is controlled by vacuum control apparatus 25 (FIG. 8) which is operated in timed relation with the movement of the gripper means. The gripper means is moved in timed relation with the movement of the conveyor means and, preferably, the operating mechanism 26 for moving the gripper means is actuated by the conveyor 22. A combination flap folder and carton support 27 is preferably provided for folding the lower trailing flap on the carton and for supporting the carton when it is released by the gripper means, and an upper flap depressing mechanism 28 is provided for depressing the flaps on the upper end of the carton in a manner to facilitate subsequent filling of the carton.

The carton erecting and folding apparatus is generally adapted for handling flattened cartons of the type having four panels hingedly articulated together along corner fold lines. In the form of the carton illustrated in FIGS. 6 and 7, and designated generally by the letter X, the carton includes a first side wall $a$ and a first end wall $b$ at one side of the flattened carton and a second side wall $c$ and a second end wall $d$ at the other side of the flattened carton. Flaps designated $a'$, $b'$, $c'$ and $d'$ are provided on the upper ends of the side walls $a-d$ and lower flaps designated $a''-d''$ are provided on the lower ends of the respective side walls. When the carton is in its flattened condition shown in FIG. 6, the first side and end walls $a$ and $b$ are disposed at one side of the carton and the second side and end walls $c$ and $d$ are disposed at the other side of the carton. As will be seen from FIG. 6, the upper and lower flaps designated $c'$ and $c''$ on the second side wall are somewhat larger than the corresponding flaps $a'$ and $a''$ on the front side wall and project outwardly therefrom. As is conventional, the flaps are connected to their respective walls along crease or fold lines.

The carton feeding and erecting apparatus can be applied to various different machines having a reciprocable transfer mechanism and may, for example, be applied to a filling machine of the general type disclosed in the patent to S. F. Anderson No. 2,612,016 and reference is hereby made to that patent for a more complete description of the construction and operation of the filling and closing mechanism, and the drive mechanism for the filling machine. The particular filling machine illustrated herein is an improved form shown in the copending application of Roger Stohlquist Ser. No. 481,717, filed Aug. 25, 1965, now Patent No. 3,364,651 and assigned to the assignee of the present invention. In general, the filling machine as shown in FIG. 1 includes a lower flap folding mechanism 31 arranged to complete the closing of the lower flaps on the carton; a filling apparatus including a nozzle 32 and an elevator 33 for elevating a container at the filling station into telescoping relation with the nozzle; and an upper flap folding mechanism 34 for closing the flaps on the upper end of the carton after it has been filled. The lower flap folding mechanism 31 may be of any conventional construction for infolding the lower flaps $b''-d''$ in proper sequence as the carton moves therepast and, similarly the upper flap folding mechanism 34 may be of any conventional construction suitable for folding the upper flaps in proper sequence. The particular flap folding structure used will vary dependent upon the type and shape of the carton end flap and may, for example, be of the type disclosed in the aforementioned Anderson Patent 2,612,016.

The conveyor mechanism 22 is arranged to advance the open cartons in step fashion through the filling machine and, as diagrammatically shown in FIG. 1, the drive mechanism for the conveyor includes a drive motor 36 which is connected to a one-revolution clutch 37 operated by an electro-responsive operator 38. The clutch drives a crank wheel 41 which is connected through a link 42, levers 43 and links 44 to the reciprocable transfer mechanism forming a part of the conveyor 22 and described more specifically hereinafter, to reciprocate the transfer mechanism through a cycle whenever the electro-responsive operator 39 is actuated. The operator 38 is conveniently actuated under the control of a switch (not shown), and which switch is arranged to be operated when the filled container at the filling station moves downwardly to a point in which its upper edge is at a level adjacent the lower end of the nozzle. At that time, the switch is closed to operate the electro-responsive operator 38 and clutch 37 to drive the transfer mechanism through one cycle. The details of construction of the drive for the transfer mechanism and the means for operating the same form no part of the present invention and further detailed description is deemed unnecessary.

The conveyor 22 includes first and second laterally spaced guide rails 48 and 49 which are spaced apart to guidably receive a container therebetween. As best shown in FIG. 4, the guide rails 48 and 49 have upper guide edges 48' and 49' and lower guide edges 48" and 49" which are spaced apart a distance substantially equal to or slightly less than the spacing between the opposite end panels such as $b$ and $d$ on the carton to guidably engage and support the carton as it is advanced along the rails. The transfer mechanism shown herein includes spaced slide plates 51 and 52 adjacent the inlet ends of the rails 48 and 49 and mounted for reciprocation lengthwise of the rails, and opposed pairs of pusher fingers 53 (FIGS. 3 and 8) are mounted on the slide plates 51 and 52 to advance the containers along the rails. The pusher fingers are arranged to engage a carton between the rails and advance the same when the slides are moved forwardly or extended, and the fingers are laterally yieldable to pass around or bypass the containers when the slides are moved rearwardly or retracted. In the embodiment illustrated, the slides 51 and 52 are normally positioned in a stop position at their extreme forward end of the stroke, as shown in FIGS. 8, 9, 10 and 10A and the slides, when operated, are sequentially retracted to the fully retracted position shown in FIGS. 11 and 11A, and then moved forwardly back to their normal stop position. Alternatively, the slides could be normally positioned at a point intermediate their fully extended and retracted positions and sequentially moved forwardly to their fully retracted position and then forwardly back to the initial intermediate position. As shown in FIG. 1, the cartons are advanced through six steps or stations as they are moved along the conveyor means, which stations are designated X1–X6, it being understood that the stroke of the machine and hence the number of steps or stations can be varied as desired.

The rail 48 is somewhat longer than the rail 49 and extends a substantial distance beyond the inlet end 49$a$ of the rail 49. The magazine 21 is positioned to support a stack of flattened cartons with the end carton spaced laterally from the guide rail 48 and adjacent the end 49$a$ of the rail 49. The carton magazine includes a bottom support 55, herein shown in the form of a flat sheet metal panel, to underlie the lower edges of the cartons in the stack to support the same, and laterally spaced magazine carton guides 56 and 57. The magazine carton guide 56, herein sometimes referred to as the first magazine carton guide, is conveniently in the form of a flat upright panel joined to or formed integrally with the bottom panel 55. For reasons pointed out hereinafter, the first magazine carton guide 56 extends approximately perpendicular to the first conveyor carton guide 48 and has its end 56$a$ laterally spaced therefrom a distance preferably approximating the spacing between the first and second conveyor carton guides 48 and 49. The magazine carton guide 57, herein sometimes referred to as the second magazine carton guide, is conveniently formed by vertical spaced rails indicated as 57$a$ and 57$b$. The rails 57$a$ and 57$b$ are supported at their forward ends on a post member 59 and at the rear ends by a generally U-shaped bracket 61, (FIGS. 1 and 5) and the second magazine carton guide defined by the rails 57$a$ and 57$b$ is laterally spaced from the first carton guide 56 a distance substantially less than a width of a flattened carton, that is less than the combined widths of the side and end panels such as $a$ and $b$ at one side of a flattened carton, so that the cartons in the stack on the magazine extend obliquely between the first and second carton guides. In the preferred embodiment illustrated, the first magazine carton guide 56 extends perpendicular to the conveyor carton guide 48 and the first and second magazine carton guides are laterally spaced apart a distance such that the cartons extend at an angle of substantially 45° with respect to the first carton guide 56. However, exact perpendicularity between the magazine carton guides and the conveyor carton guides is not essential in all applications and, as used here, the term "approximately perpendicular" is intended to cover a range of equivalents; for example, of the order of within 10% of an exact right angular relationship. The cartons frequently have a nonuniform thickness when in a flattened condition, due to the overlapping seamline indicated at $f$ in FIGS. 6 and 7. In order to compensate for this nonuniform thickness, the lateral magazine carton guides 56 and 57 are advantageously arranged as shown in FIG. 8 so that they are spaced slightly closer adjacent their rear ends than adjacent their forward ends. With this arrangement, the rear cartons in the stack are disposed at a more acute angle with respect to the guide 56 than the front cartons in the stack. This increased carton angle reduces the friction of the edges of the cartons against the guide 56 and increases the component of the pressure applied to the rear end of the stack to feed the cartons forward, when the hopper is full. As shown, the forward ends of the lateral carton magazines are maintained in spaced relation by a generally L-shaped bracket 62 which is attached to the guide 56 and to the post member 59 and spans the space between the guides at a level above the tops of the cartons.

A carton stop 65 is provided on the first lateral magazine carton guide 56 at the forward end thereof, that is at the end adjacent the conveyor 22. The carton stop 65 extends laterally of the magazine carton guide 56 in a direction inwardly of the magazine at a level to engage the end carton in the stack along the side fold line thereof. As shown, the carton stop 65 is in the form of two separate members arranged to engage the end carton adjacent the upper and lower ends of the end panel b. For reasons pointed out hereinafter, the stop is provided with a carton edge engaging face 65a which is disposed approximately perpendicular to the face of the end panel in the stack, to stop movement of the cartons as they are advanced along the magazine, and the post 59 is provided with a carton edge engaging face 59a which is inclined outwardly from the second magazine carton guide 57 at an angle to extend approximately perpendicular to the face of the end carton in the stack. The face 59a is spaced from the carton engaging face 65a a distance approximately equal to the width of a flattened carton and the two carton engaging faces define a magazine mouth therebetween which is disposed in a plane inclined to the longitudinal axis of the magazine and also inclined to the conveyor means 22. The faces 59a and 65a preferably converge slightly in a direction away from the magazine so as to provide a restricted passageway through which the end carton can be withdrawn. As described hereinafter, the end carton is progressively opened as it is withdrawn from the stack and this produces a foreshortening across diagonally opposite corners. The aforedescribed converging relation between the faces 65a and 59a compensates for this foreshortening of the carton due to the partial opening thereof, as it is moved off the stack.

A means is provided for retarding movement of the second side wall c and second end wall d of the end carton, as the first side and end wall of that carton is pulled off the stack. As best shown in FIG. 6, the upper and lower flaps a' and a" on the first side wall a of the flattened carton are somewhat smaller than the upper and lower flaps c' and c" on the second side wall c of the flattened carton so that the latter flaps project outwardly from the flaps a' and a". At least one and preferably two stop fingers designated as 71' and 71" are provided on the carton magazine and positioned to engage the upper and lower flaps c' and c" at the rear side of the front carton in the stack, as shown in FIG. 6. These stop fingers are disposed adjacent a plane through carton engaging faces 59a and 65a and aid in retaining the flattened carton in the magazine and, in addition, function to retard movement of the second side and end panels off the stack, as the first side and end panels are moved laterally away from the stack, to thereby at least partially open the end carton in the stack during the removal of the end carton from the stack.

As previously noted, the flattened cartons extend obliquely between the magazine carton guides 56 and 57 and, as best shown in FIGS. 10 and 11, the edge fold line of the carton adjacent the guide 56 leads the edge fold line of the carton adjacent the other guide 57. A means is provided for advancing the cartons along the magazine to the carton stop 65 and this means is arranged to engage the cartons adjacent their trailing edge. As best shown in FIG. 8, the carton advancing means includes an angulated member having one leg 75 arranged to extend generally parallel to the side carton guide 57 and engage the trailing edge fold lines of the carton, and a second leg 76 disposed at an angle of substantially less than 90° with respect to the first leg 75 and arranged to engage the rear face of the rear end carton in the stack. A means including a flexible cable 78 is attached to a hook 79 on the end of the leg 75, and the cable is entrained over pulleys 80, 80' and 80" and is terminally connected to a spring means 81 (FIG. 4) which applies a yieldable tension to the cable to advance the stack of cartons along the magazine toward the stop 65. A finger grip portion 77 is provided on the angulated carton advancing member to facilitate manual retraction for reloading of the magazine.

The gripper means 23 operates to remove the end cartons one at a time from the stack and to open and square the cartons as they are moved into position on the conveyor means 22. The gripper means includes a plurality of suction cups, herein shown three in number and designated 82a–82c which are mounted on tubular arms 83a–83c respectively for swinging movement about the axis of a shaft 84. The vacuum cups are supported on laterally extending end portion 85 on the respective arms so that the face of the cups is disposed in a plane generally paralleling the lengthwise axis of the arms. As will be seen from FIG. 10A, the cups 82a and 82c are disposed at a level to engage the end flaps b' and b" on the upper and lower ends of the first end panel, and the vacuum cup 82b is positioned to engage the wall portion of the end panel b. The cups 82a–82c are preferably arranged so that they are not disposed in vertical alignment, but are instead staggered somewhat as shown in FIGS. 10A and 11A. The shaft 84 is conveniently mounted for rotation about an upright axis in a bracket 86 (see FIG. 4) attached to the front rail 48. As will be seen, the axis of the shaft 84 is spaced longitudinally a substantial distance from the end 49a of the second conveyor carton guide rail 49 and is so located that the vacuum cups are swingable about the axis of the shaft 84 from a first position as shown in FIG. 10 in which the cups are adjacent and generally parallel to the rail 48 and a second position as shown in FIG. 11 in which the cups engage the front face of the end panel in the stack in substantially parallel relation thereto. The gripper means is operative to grip the first end panel b on the end carton and to swing the end panel therewith off the stack and toward the conveyor means. As will be seen from FIG. 11, the carton edge engaging face 65a of the stop 65 is disposed generally tangent to the path of movement of the lead edge fold line of the carton as it is swung with the gripper means off the stack. Similarly, the carton engaging face 59a on the member 59 is disposed generally tangent to the path of movement on the trailing edge fold line of the flattened carton, as the carton is moved off the stack, the face 59a converging slightly with respect to the face 65a to accommodate the diagonal foreshortening of the flattened carton which occurs during the opening of the same.

The vacuum cups 82a–82c are moved from their normal position shown in FIG. 10 to their carton engaging position shown in FIG. 11 and back in timed relation with the movement of the transfer mechanism on the conveyor 22, to feed cartons from the stack to the conveyor and to open the cartons as they are moved toward the conveyor. The feed mechanism is preferably operated from the transfer mechanism and, for this purpose, a cam indicated at 91 (FIGS. 4, 8 and 9) is attached to the slide member 51 and engages a follower, herein shown in the form of a roller 92. The follower 92 is attached to the intermediate gripper arm 83b at a point spaced radially from the shaft 84 and the cam is shaped as shown in FIG. 8 so as to cam the arms 83a–83c to their retracted position shown in FIG. 8, when the transfer member is in its forward position, and to allow the arms to swing into engagement with the end carton in the magazine as shown in FIG. 11, when the slide member is retracted. The gripper support arms 83a–83c are yieldably urged in a direction to engage the end carton in the stack and, for this purpose, a spring indicated at 96 (FIGS. 4 and 13) is attached at a point eccentric to the shaft 84 by a lever 97 which is nonrotatably secured to the shaft, and the spring is otherwise attached to a stationary portion of the frame to yieldably urge the grippers in a direction to engage the end carton in the stack.

Figure 12:
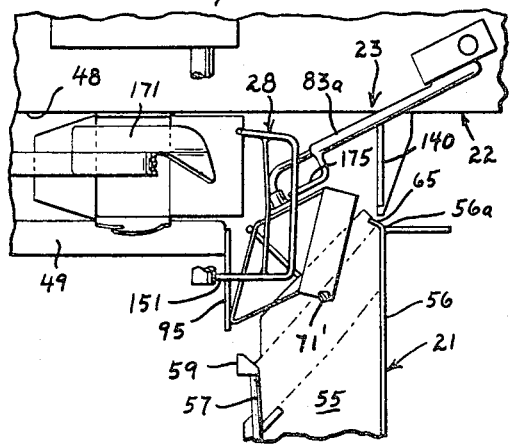
Figure 13:
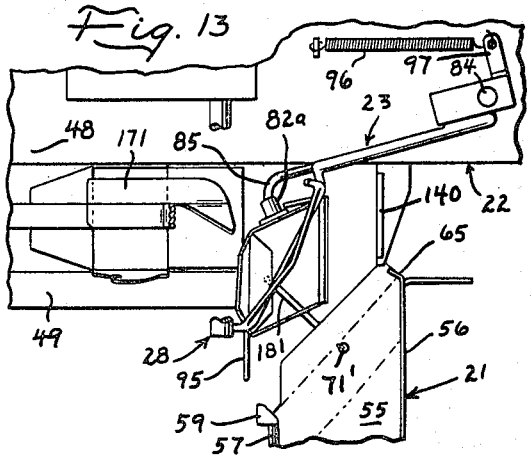

The vacuum cups 82a–82c are arranged to engage the end panel b and the upper and lower flaps b' and b" located at the front side of the flattened carton. As the vacuum cups are moved back to their normal position, they draw the end panel b and its flaps therewith. The fingers 71' and 71" on the magazine engage the flaps c' and c" on the second side panel at the rear side of the flattened carton so that withdrawal of the flattened carton by the gripper means tends to partially open the flattened carton during movement of the same off the magazine. A cam means designated 95 is provided for further deflecting the first side wall a of the carton relative to the first end wall b, as the first end wall is moved off the stack into a position adjacent the rail 48. As best shown in FIG. 8, the cam 95 is located at the end 49a of the second conveyor guide rail 49 and extends laterally therefrom within the angle subtended by the arm 83b during movement from the position shown in FIG. 11 to the position shown in FIG. 10. The cam is positioned radially outwardly of the path of movement of the vacuum cups 82 and in a position to engage the forward side wall a of the carton as it is moved off the stack and into engagement with the rail. The cam, as shown in FIGS. 12 and 13, deflects the first side wall a of the carton to a position substantially perpendicular to the first end wall b, as the carton moves past the cam 95, to thereby effect squaring of the carton during movement of the carton to a position alongside the rail 48.

Any suitable means may be provided for controlling the application of vacuum to the gripper cups 83a–83c in timed relation with the movement of the same, to apply vacuum to the cups as they engage the end carton in the stack and to release the vacuum on the cups when the arms are returned to their normal retracted position as shown in FIGS. 8 and 10. As diagrammatically shown in FIGS. 1 and 8, a vacuum pump 101 is conveniently provided in the base of the machine and is connected through a vacuum line 102 to a valve diagrammatically indicated at 103 in FIG. 8, the valve being connected through flexible lines 104 to the several arms 83a–83c. The valve has an actuator 105 which is conveniently arranged to be operated by a cam 106 connected to the slide. The valve 103 is of a known type which will vent the line 104 to atmosphere when the valve is in its normal position, and which is operated to close the atmospheric vent and communicate the line 104 with the vacuum line 102, when the actuator is depressed. As will be seen from FIG. 8, the cam 106 actuates the valve actuator 105 when the slide is retracted and operates to apply vacuum to the cups as they engage the end carton in the stack.

Figure 9:
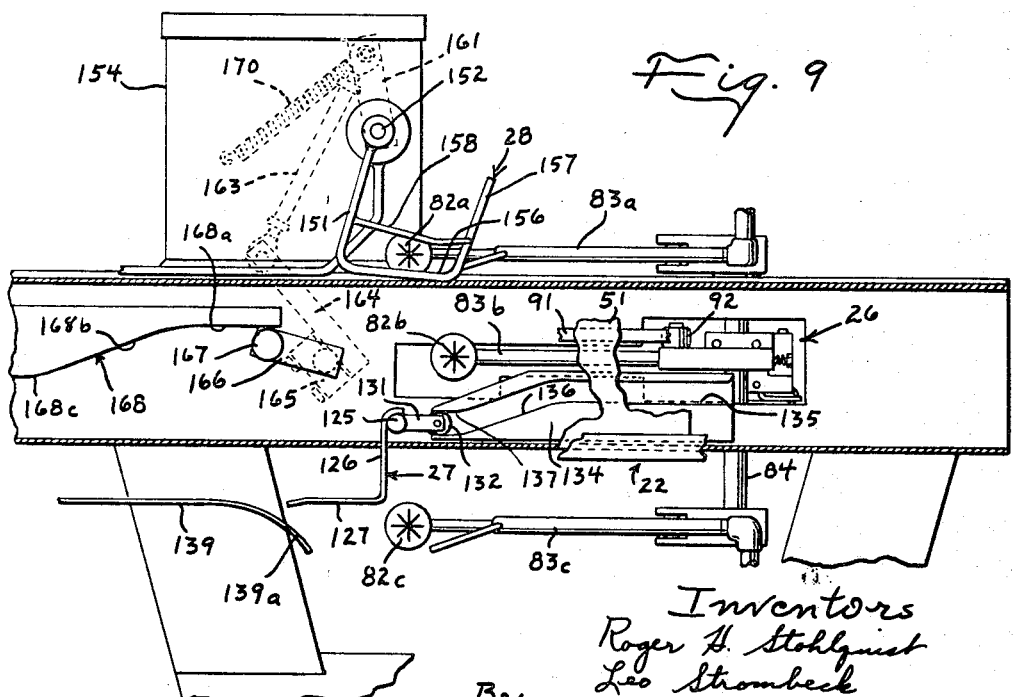
FIG. 9 is a fragmentary vertical sectional view taken on the plane 9—9 of FIG. 8.
Figure 13A:
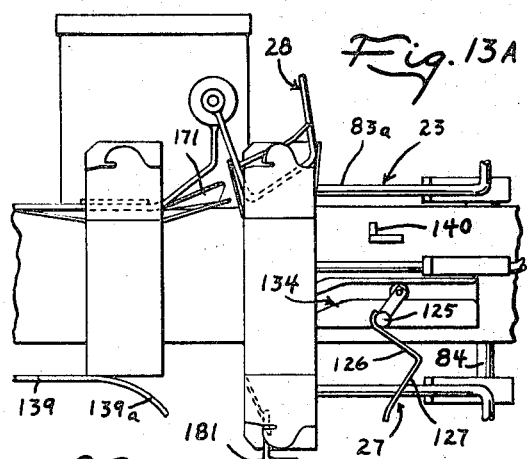

The carton, at the time it is released by the gripper means, has the end panel b thereof disposed alongside the rail 48, adjacent the end 49a of the rail 49. The combination flap folder and carton support mechanism 27 is provided on the transfer mechanism for folding the trailing flap on the carton and for underlying and supporting the carton as it is advanced to a position between the rails 48 and 49. The flap folder and carton support includes a generally L-shaped member which is pivotally mounted on a pin 125 on the slide 51, and which L-shaped member has a depending portion 126 arranged to engage the trailing side wall c of the carton, and a forwardly extending flap folding portion 127. The flap folder and support member 27 is movable with the slide and is also swingable relative to the slide between a retracted position as shown in FIG. 13A, and a carton support position as shown in FIGS. 8, 9 and 10A. A rearwardly extending arm 131 is provided on one end of the shaft 125 and located outwardly of the slide 51, and a roller 132 is provided on the arm 131 and arranged to engage a stationary cam track 134. The cam track has a dwell portion 135 which engages the roller when the slide is retracted and a ramp portion 136 intermediate its ends which forces the roller downwardly and moves the support member 27 to its support position. A second dwell portion 137 extends from the ramp 136 and maintains the support member in its carton supporting position as the slide continues its forward movement. As will be seen from FIGS. 11A, 13A, 14A and 10A, the support member, during forward movement of the slide, is swung upwardly from its retracted position shown in FIG. 11A to its support position shown in FIG. 10A to fold the lower trailing flap c" upwardly and forwardly. The depending portion 126 of the support member engages a trailing side wall c of the carton to advance the same and the flap folding portion 127 underlies and supports the carton as it is advanced by the slide, until the carton reaches an extended position shown in FIG. 10A in which the carton is disposed between the rails 48 and 49 and is supported therebetween. An upper carton pusher 140 is preferably provided on the slide 51 above the flap folding and support mechanism 27 to engage the trailing side wall adjacent the upper end of the carton during extension of the slide. A carton support and flap guide 139 is provided between and below the rails 48 and 49 and has a downwardly and rearwardly inclined end 139a arranged to engage the lead flap c" on the lower end of the carton and fold the same inwardly as shown in FIGS. 10A and 11A, after the trailing flap has been folded inwardly.

In order to avoid interference with the upper flaps during filling, it is desirable to spread the upper flaps on the carton. An improved upper flap depressing apparatus is provided for folding the upper lead flap on the carton forwardly as the carton enters the space between the guide rails, and for also depressing the trail flap and preferably at least one of the side flaps. As best shown in FIGS. 4 and 9, this upper flap depressing apparatus includes an arm 151 which is attached to a shaft 152 that extends crosswise of the conveyor means at a level above the tops of the cartons and adjacent the end of the second conveyor guide rail 49. The shaft 152 is supported in a sleeve 153 carried by a housing 154 attached to the support rail 48 and the arm is swingable from an elevated position as shown in FIG. 11A to a lowered position as shown in FIG. 10A. The flap depressing arm includes an arm portion 155 which extends laterally from the shaft 152, and a flap engaging portion 156 having one end 156a thereof attached to or formed integrally with the outer end of the arm portion 155.

As best shown in FIGS. 4, 8 and 10, the flap engaging portion 156 of the flap depressor arm extends generally horizontally when in its lowered position from a point laterally outwardly of the second conveyor carton guide 49 to a point intermediate the lateral conveyor carton guides and preferably closely adjacent the first conveyor carton guide 48. Moreover, the flap engaging portion, when in its lowered position, extends oblique to the conveyor carton guides as viewed in plan and is inclined from the end 156a attached to the arm portion 155 in a direction rearwardly with respect to the path of travel of the cartons on the conveyor. The arm also includes a portion 157 which extends laterally from the other end of the flap engaging portion 156, and an auxiliary flap deflector bar 158 which extends between the arm portion 155 and the lateral end portion 157.

The arm is moved between its raised and lowered positions in timed relation with the movement of the transfer means and also in timed relation with the movement of the gripper means. For this purpose, an arm 161 (FIG. 9) is attached to the shaft 152 inside the support housing 154 and is connected through a link 163 to an arm 164. The arm 164 is pivotally supported for rotation about the axis of a pivot shaft 165, and a lever 166 is connected to the pivot shaft 165 and has a follower 167 arranged to engage a cam 168 on the slide 51. The cam 168 has a dwell portion 168a arranged to engage the follower 167 and support the arm in its lowered position when the slide is fully extended and a ramp portion 168b to force the arm upwardly as the slide is retracted. A second dwell portion 168c is arranged to engage the follower 167 and support the arm in its raised position when the slide is fully retracted. In its raised position shown in FIG. 11A, the arm portion 151 extends generally horizontally at a level above the tops of the carton flaps and the flap engaging portion 156 extends upwardly at an angle from the arm portion.

Figure 14:
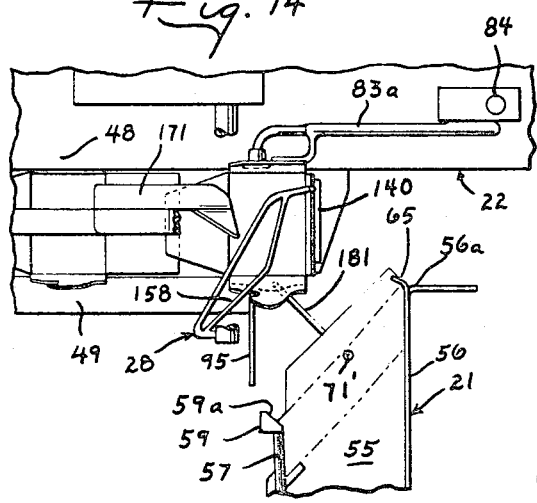
Figure 14A:
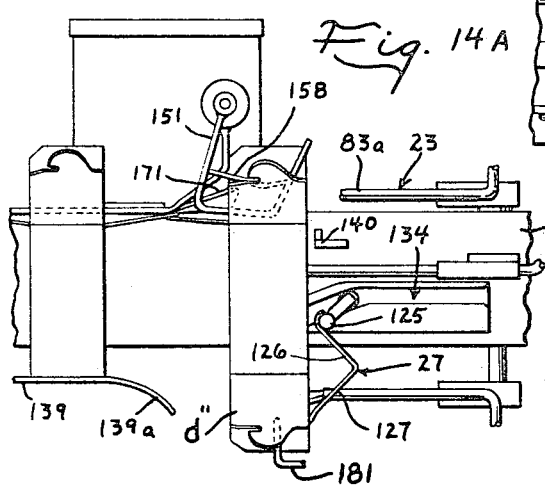
Figure 15:
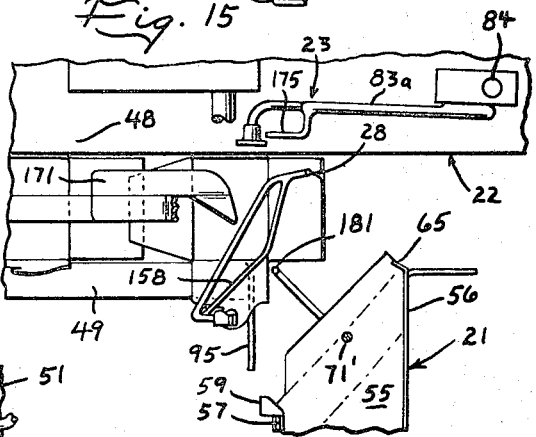

The upper flap depressing arm is yieldably urged downwardly by a spring 170 and the ramp 168b is arranged to control downward movement of the same during extension of the slide, so that the flap engaging portion 156 moves downwardly and enters the space between the upper flaps on the partially opened carton, before the carton has moved into engagement with the first conveyor carton rail 48, and while the first side wall $a$ of the carton is in engagement with the cam 95 at the end of the second carton guide rail, as is shown in FIGS. 13 and 13A. The arm is swung downwardly and forwardly with respect to the direction of movement of the cartons on the transfer mechanism during extension of the slide so that the end 156a of the flap engaging portion 156 engages the upper forward flap $a'$ on the carton and deflects the same forwardly while the forward panel $a$ of the carton is laterally supported by the cam plate 95 to "break" the first side flaps $a'$ relative to the first side wall $a$ along the fold line therebetween. As will be seen from FIG. 13, the flap engaging portion of the arm extends generally diagonally of the partially opened carton and, as it continues its downward and forward swinging movement, it further depresses the upper lead flap on the carton, as shown in FIGS. 14 and 14A. When the carton reaches a position alongside the rail 48, the transfer member has advanced to a position such that the combination carton support and pusher member 27 engages and advances the carton to a position between the rails 48 and 49. The dwell portion 168a on the cam is arranged to hold the upper flap depressor arm on its lowered position during this forward movement of the carton by the transfer mechanism. Since the flap engaging portion extends oblique to the path of movement to the cartons, it depresses the trailing flap $c'$ on the upper end of the carton to fold the same outwardly and rearwardly while simultaneously depressing upper flap $d'$ on the end wall $d$ of the carton, to fold the same laterally outwardly of the carton. As shown in FIGS. 14, 14A and 15, the end portion 157 of the depressor arm is inclined upwardly and rearwardly when the arm is in its lowered position to aid in guiding the trailing flap downwardly. The auxiliary flap engaging member 158 is shaped so that it is inclined rearwardly with respect to the path of travel of the cartons at a greater angle than the flap engaging member 156 when the arm is in its lowered position to engage the end flap $d'$ at a point substantially above the fold line thereof, as is clearly shown in FIG. 14, to aid in deflecting the end flap laterally outwardly of the carton.

A stationary flap depressor 171 is mounted to overlie the upper ends of the carton and hold the lead and trail flaps in a depressed condition as the carton is advanced to the filling station. The gripper arms 83a–83c begin to swing inwardly as soon as the transfer mechanism is retracted and, in order to prevent interference between the vacuum cup 82a and the trailing flap on the upper end of the carton, a finger 175 may be provided on the upper arm 83a and arranged to engage the trail flap on the upper end of the carton during inward swinging movement of the arms. As will be seen from FIG. 16, the finger 175 is disposed at a level adjacent the underside of the upper vacuum cup.

A finger 181 is advantageously provided to facilitate infolding of the lower flap $c''$ on the rear side of the carton. As best shown in FIG. 8, the finger 181 is disposed at a point spaced from the end 49a of the carton guide rail 49, a distance less than the width of the end walls $b$ and $d$ of the carton, and the finger is located laterally outwardly of the plane of the carton guide edges 49' and 49'' to engage the lower end flap $d''$ as the carton is moved from the stack into position on the conveyor, and draw that flap outwardly of the carton as shown in FIGS. 14 and 14a as the carton is moved laterally toward the rail 48. This holds flap $d''$ out of the way of flap $c''$ and facilitates infolding of flap $c''$ by the carton support and pusher member 27. The lower gripper means 82c also momentarily holds lower end flap $b''$ out of the way of flap $c''$.

From the foregoing it is thought that the construction and operation of the carton feed and erecting apparatus would be readily understood. The transfer mechanism slides 51 and 52 are cyclically operated, either automatically in response to filling of a carton as previously described, or otherwise, to intermittently advance the open cartons past the lower flap folding shoes to the filling station and to advance the filled cartons past the upper flap folding shoes to the loading platform. In the apparatus disclosed, the slides are normally in the extended position shown in FIGS. 8, 9, 10 and 10A. When the slides are in their fully extended position, an opened carton is positioned immediately in advance of the carton pushers 53 on the transfer mechanism; the upper flap folding arm 28 is in its lowered position and the carton grippers 23 are in their retracted position. As the slide is retracted, the cam 91 allows the gripper arms to swing inwardly and, simultaneously, the cam 168 allows the upper flap depressor to swing upwardly. The upward movement of the upper flap depressor and the arms is controlled by the cams 168 and 91 respectively so that the arms 23 move inwardly into overlying relation with the trailing flap on the upper end of the carton before the upper flap depressor swings upwardly sufficiently to release the trailing flap $c'$ so that the finger 175 on the gripper arms can hold the trailing flap in a depressed condition during continued inward swinging movement of the arm 83a.

When the slide is fully retracted, the gripper arms 83a–83c are positioned in engagement with the end carton magazine as shown in FIGS. 11 and 11A and the upper flap depressor is in its raised position. As the transfer mechanism moves forwardly, the gripper arms move laterally away from the stack and draw the end panel $b$ therewith. During this initial movement, the edge fold lines of the flattended carton are constrained between the faces 59a and 65a which, as previously described, extend generally tangent to the path of movement to the respective edges of the carton, and approximately perpendicular to the face of the end carton in the stack. As the gripper arms continue movement away from the end of the stack, the front side wall $a$ of the carton engages the cam 95 and is deflected thereby to complete the squaring of the carton and, simultaneously, the upper flap depressor swings downwardly as shown in FIGS. 12 and 13 so that the upper flap depressor enters the space between the upper flaps before the carton is squared and while the front panel $a$ is in engagement with the cam face 95. The upper flap depressor thus deflects the flap $a'$ forwardly and, after the carton has moved into position alongside the guide rail 48, the pusher 27 swings upwardly to infold the lower trailing flap $c''$ and to simultaneously support the carton and advance the same. The upper flap depressor is retained in a lowered position during continued advance of the cartons and operates in the manner previously described to deflect the upper rear flap rearwardly and to also deflect the upper flap $d'$ outwardly.

While a particular embodiment of the present invention has been shown and described, it will be understood that the apparatus is capable of modification and variation without departing from the principles of the invention, and that the scope of the invention should be limited only by the scope and proper interpretation of the claims appended hereto.

We claim:

1. In an apparatus for erecting flattened cartons of the type having a first end panel and a first side panel at one side of the flattened carton joined along edge fold lines to a second side panel and a second end panel at the other side of the flattened carton, said panels including wall portions and end flaps on the ends of at least some wall portions, the apparatus having conveyor means for advancing cartons in one direction along a path, the improvement comprising a carton magazine laterally offset from said path and having first and second lateral carton guides extending approximately perpendicular to said path and spaced apart a distance less than the width of a flattened carton for receiving and supporting a stack of flattened cartons with the cartons extending obliquely between said first and second lateral carton guides, said second carton guide having its outlet end spaced relatively farther from said path than the outlet end of the first guide and defining a magazine mouth between the outlet ends of the lateral carton guides, said magazine mouth having a width approximating the width of a flattened carton and disposed at an angle of around 45° relative to said path of the conveyor means and to said first lateral carton guide, means for advancing cartons in the magazine toward said magazine mouth with the edge fold line of each carton that engages said first lateral carton guide leading the other edge fold line, a carton stop at the outlet end of said first carton guide having a first carton edge engaging face defining an included angle of substantially greater than 90° with respect to said first lateral carton guide and extending transverse to the plane of said magazine mouth to engage the lead edge fold line of the end carton in the stack, gripper means engageable with a face of the carton at the end of the stack, means for moving said gripper means from a first position adjacent the end carton in the magazine to a second position adjacent said path to engage one of the panels at said one side of the flattened carton and pull that panel laterally away from the stack into said path, and means operative on the carton as the gripper means is moved from said first position to said second position to open and substantially square the carton.

2. An apparatus according to claim 1 including means on said second carton guide defining a second carton edge engaging face spaced from said first carton edge engaging face a distance approximately equal to the width of a flattened carton and inclined outwardly of the magazine to extend approximately perpendicular to the magazine mouth.

3. An apparatus according to claim 2 wherein said first and second carton edge engaging faces converge slightly in a direction away from the magazine to a spacing slightly less than the width of a flattened carton.

4. An apparatus according to claim 1 wherein the means for advancing a stack of cartons includes a pusher engageable with the rearmost carton in the stack at a point adjacent said second carton guide.

5. In an apparatus for erecting flattened cartons of the type having a first end panel and a first side panel at one side of the flattened carton joined along edge fold lines to a second side panel and a second end panel at the other side of the flattened carton, the panels including wall portions and closure flaps on the ends of at least some wall portions, the apparatus having conveyor means including first and second laterally spaced conveyor carton guides engageable with opposite end panels on the carton for laterally guiding the same and transfer means operable to advance cartons in a forward direction between said conveyor guides, the improvement comprising a carton magazine extending laterally of said first conveyor carton guide and laterally offset therefrom, said magazine including a first magazine carton guide extending transverse to said first conveyor carton guide and a second magazine carton guide spaced in said forward direction from said first magazine carton guide a distance substantially less than the width of a flattened carton to receive and support a stack of flattened cartons with the cartons extending obliquely between said first and second magazine carton guides, said second carton guide having its outlet end spaced relatively farther from said path than the outlet end of said first carton guide and defining a magazine mouth between the outlet ends of the lateral carton guides, said magazine mouth having a width approximating the width of a flattened carton and disposed in a plane at an acute angle to said path and to said first carton guide, means for advancing a stack of cartons along said magazine toward said first conveyor carton guide with the edge fold line of each carton that engages the first magazine carton guide leading the edge fold line of the carton that engages the second magazine carton guide whereby the face of the front carton in the magazine diverges in said forward direction at a preselected angle relative to said first conveyor carton guide, gripper means supported for swinging movement through said preselected angle from a first position adjacent the front carton in the stack to a second position adjacent said first conveyor carton guide to engage one of the panels on said one side of the flattened carton and to pull that panel laterally off from the stack, a carton stop on said first magazine carton guide having a first face for engaging the leading edge fold line of the front carton, said first face of the carton stop defining an included angle of substantially greater than 90° to the first magazine carton guide, said first carton engaging face extending transverse to the plane of the magazine mouth and approximately tangent to the path of movement of the leading edge fold line on the front carton as said one panel is pulled off the stack by said swinging gripper means, and means operative on the carton as the gripper means is moved from said first position to said second position to open and substantially square the carton.

6. An apparatus according to claim 5 including means on said second magazine carton guide defining a second face at the outlet end of the second magazine carton guide for engaging the trailing edge of the front carton in the magazine, said second face being spaced from said first face a distance approximately equal to the width of a flattened carton and inclined outwardly of the magazine at an angle to extend approximately tangent to the path of movement of the trailing edge fold line on the front carton as it is moved off the stack by the gripper means.

7. An apparatus according to claim 6 wherein said first and second faces converge slightly in a direction away from the magazine to a spacing slightly less than the width of a flattened carton.

8. An apparatus according to claim 5 wherein said first and second magazine carton guides extend approximately perpendicular to said first conveyor carton guide and said preselected angle between the front carton and the first conveyor carton guide is approximately 45 degrees.

9. An apparatus according to claim 5 including an upper flap depressor mounted for swinging movement about an axis extending crosswise of said conveyor means at a level above the cartons and adjacent one end of the second conveyor carton guide, the flap depressor having an arm and means for swinging the arm between an elevated position and a lowered position, said arm having an elongated flap engaging portion arranged when said arm is in said lowered position to extend oblique to said first and second conveyor carton guides at an angle directed rearwardly with respect to said forward direction of advance of the cartons by the transfer means from a point laterally outwardly of the second conveyor carton guide to a point between the first and second conveyor carton guides, and means for moving said arm between said elevated and said lowered positions in timed relation with the movement of said transfer means and said gripper means.

10. An apparatus according to claim 9 wherein said means for opening and squaring the carton includes cam means positioned to engage said first side panel on the carton as the first end panel is moved by the gripper means from said first to said second position for deflecting said first side panel at an angle to said first end panel, said arm moving means being arranged to swing said arm downwardly and forwardly to engage and deflect the upper flap on said first side panel in said forward direction while said first side panel is in engagement with said cam means.

11. In an apparatus for erecting flattened cartons of the type having a first end panel and a first side panel at one side of the flattened carton joined along edge fold lines to a second side panel and a second end panel at the other side of the flattened carton, said panels including wall portions and end flaps on the ends of at least some wall portions, said apparatus including conveyor means having first and second laterally spaced conveyor carton guides and a transfer mechanism mounted for reciprocation lengthwise of said conveyor carton guides for advancing cartons in a forward direction therebetween, a magazine for supporting a stack of flattened cartons with the carton at the end of the stack spaced laterally from said first conveyor carton guide and adjacent one end of said second conveyor carton guide, gripper means for gripping the face of said first end panel on the carton, means operated in timed relation with the movement of the transfer mechanism for moving the gripper means from a first position engaging said first end panel on the end carton in the stack to a second position adjacent said guide means for pulling the end panel laterally away from the stack and into engagement with the guide means to thereby open the carton, and means on the transfer means engageable with the opened carton for advancing the same along the guide means, the improvement comprising an upper flap depressor mounted for swinging movement about an axis extending crosswise of said conveyor means at a level above the cartons and adjacent said one end of said second conveyor carton guide, the flap depressor having an arm and means for swinging the arm between an elevated position and a lowered position, said arm having an elongated flap engaging portion arranged when said arm is in said lowered position to extend oblique to said first and second conveyor carton guides at an angle directed rearwardly with respect to the direction of advance of the cartons by the transfer means from a point laterally outwardly of the second conveyor carton guide to a point between the conveyor carton guides, means for moving said arm between said elevated and said lowered position in timed relation with the movement of said transfer mechanism and said gripper means, and cam means at said one end of said second conveyor carton guide positioned to engage said first side panel on the carton as the first end panel of the carton is moved by said gripper means from said first to said second position for deflecting said first side panel at an angle to said first end panel, said arm moving means being arranged to swing said arm downwardly and in a direction to engage and deflect the upper flap on said first side panel in said forward direction while said first side panel is in engagement with said cam means.

12. An apparatus according to claim 11 wherein said arm moving means is arranged to maintain said arm in said lowered position after said gripper means has moved said first end panel into engagement with said first conveyor carton guide and until said transfer means has advanced the carton at least part way past the arm whereby the arm operates to deflect the upper flap on the second side panel of the carton in a rearward direction.

References Cited
UNITED STATES PATENTS

| | | | |
|---|---|---|---|
| 2,677,543 | 5/1954 | Ohrn | 93—52 X |
| 2,956,483 | 10/1960 | Hartbauer | 93—53 |
| 3,298,288 | 1/1967 | Anderson | 93—53 |

WAYNE A. MORSE, JR., *Primary Examiner.*

U.S. Cl. X.R.

93—36